United States Patent [19]

Jinno et al.

[11] Patent Number: 4,737,539

[45] Date of Patent: Apr. 12, 1988

[54] BEARING RESIN MATERIAL

[75] Inventors: Osamu Jinno, Nagoya; Tatsuhiko Fukuoka, Aichi, both of Japan

[73] Assignee: Taiho Kogyo Co., Ltd., Aichi, Japan

[21] Appl. No.: 32,923

[22] Filed: Mar. 30, 1987

Related U.S. Application Data

[63] Continuation of Ser. No. 790,003, Oct. 22, 1985, abandoned.

[30] Foreign Application Priority Data

Oct. 22, 1984 [JP] Japan ................................ 59-220400

[51] Int. Cl.$^4$ .............................................. C08L 69/00
[52] U.S. Cl. .................................... 524/508; 524/509; 524/513; 524/514; 524/524; 524/537; 524/538; 525/146; 525/155; 525/166; 525/184; 525/179; 525/420; 525/425; 525/400; 525/432; 525/433
[58] Field of Search ............... 525/146, 155, 166, 179, 525/420, 425, 432, 433, 184, 400; 524/508, 509, 513, 514, 524, 537, 538

[56] References Cited

U.S. PATENT DOCUMENTS 4,532,275  7/1985  Aito et al. ............................ 523/468

Primary Examiner—Theodore E. Pertilla
Attorney, Agent, or Firm—Armstrong, Nikaido, Marmelstein & Kubovcik

[57] ABSTRACT

Resin bearing material consists essentially of at least one thermoplastic resin material selected from the group consisting of polyacetal, polyamide, polycarbonate, polyphenylene sulfide, polyethylene terephthalate, and ultra-high molecular weight polyethylene, and of aromatic group, polyamide fiber, and is produced by the steps comprising kneading and extruding said at least one thermoplastic resin material and the cutting the extruded material.

The sliding characteristics are superior to the conventional oleo-bearing materials containing the carbon fiber, and glass fiber.

19 Claims, 8 Drawing Sheets 0.5mm

BEARING RESIN MATERIAL

This application is a continuation of application Ser. No. 790,003 filed 10/22/85, now abandoned.

BACKGROUND OF THE INVENTION

1. Field of the Invention

The present invention relates to bearing resin material. More particularly, the present invention relates to resin material in which the fiber is incorporated, and which is occasionally impregnated with lubricating oil.

2. Description of the Related Art

Phenol resin, polyamide resin (nylon), fluorocarbon resin, polyacetal resin, polycarbonate resin, and the like are conventionally used as the basic material for low-grade bearing materials. Lead, graphite, $MoS_2$, fiber, and the like are incorporated into one or more of these resin materials to enhance the sliding characteristics thereof. So-called plastic bearing materials are also conventionally used, and the fibers conventionally incorporated into the plastic bearing materials are carbon fiber, glass fiber, and cotton.

It is known to incorporate the polyacetal with lubricating oil in the field of oleo-bearing materials. Japanese Unexamined Patent Publication No. 46-5321 discloses a method for producing an oleo-bearing material having a uniform distribution of the lubricating oil.

The disclosed method essentially resides in heating the thermoplastic resin to a temperature higher than the softening point, stirring in lubricating oil, and then allowing it to cool.

It is also known in the field of plastic bearing materials to fill the plastic with the polytetrafluoroethylene (PTFE) to enhance the sliding characteristic.

The present inventors investigated the characteristics of the conventional bearing materials from the viewpoint of improving the sliding characteristics.

In general, the plastic bearing materials are more advantageous than metal bearing materials from the standpoints of lighter weight and elimination of the necessity for lubrication during use, but the plastic bearing materials are less advantageous than the metal bearing materials from the standpoints of a lower strength and lower PV-value, and hence are not practical for use under a great load. If the disadvantages of the plastic bearing material(s) (hereinafter referred to as the "bearing material(s)") can be overcome while maintaining their advantages, they could be used over a broader field than at present, and a great contribution could be made to enhancing the properties and reliability of the bearing devices.

Lead, $MoS_2$, graphite and the like, which are incorporated in the resin as the basic component of the bearing materials, cause a reduction in the coefficient of friction but virtually do not contribute at all to strengthening the resin. In fact, lead and the like decrease the strength of the resin. In addition, the coefficient of friction is increased under a high load. The bearing materials having lead and the like incorporated therein are therefore disadvantageously liable to seize under a high load.

Glass fiber, carbon fiber, cotton and the like, which are conventionally incorporated into the bearing materials, give a fiber-reinforcement to the materials but cause a conspicuous wear of the other materials in the bearing device. In addition, the amount of wear in the bearing materials per se is high. Among the above mentioned fibers, cotton causes a relatively small amount of wear in the bearing materials and the other materials. Such an amount of wear is, however, still unsatisfactory. The conventional fiber-incorporated bearing materials exhibit a high coefficient of friction and a low PV value under thrust loading test conditions.

The conventional oleo-bearing materials are superior to the bearing materials free of fibers from the standpoints of their coefficient of frictions and wear resistance. Their loading capacity is, however, unsatisfactory. The coefficient of friction tends to increase under a high load and, therefore, the conventional oleo-bearing materials are liable to seize under a high load. Regarding the loading capacity and the sliding characteristics under a high load of the oleobearing materials, since they are superior to those of the fiber bearing materials, the oleo-bearing materials can be used under relatively severe conditions. If it is intended to use the oleo-bearing materials under more severe conditions, similar to those under which metal bearing materials can be used, it would become obvious that, in comparison, the sliding characteristics of the conventional oleo-bearing materials are unsatisfactory, and such unsatisfactory sliding characteristic cannot be overcome by impregnating the lipophilic fiber with oil.

SUMMARY OF INVENTION

It is an object of the present invention to improve the sliding characteristics of the conventional bearing materials.

In accordance with the objects of the present invention, there is provided a resin bearing material consisting essentially of at least one thermoplastic resin material selected from the group consisting of polyacetal, polyamide, polycarbonate, polyphenylene sulfide, polyethylene terephthalate, and ultara-high molecular weight polyethylene, and of the aromatic group polyamide fibers.

The other objects of the present invention will be apparent from the following descriptions of the experiments carried out by the present inventors.

The present inventors recognized that, in the prior art, the lubricating oil is one of the components of sliding materials lubricating oil that is most effective in improving the sliding characteristics. The present inventors therefore compared the sliding characteristics of the oleo-bearing material with those of the polyacetal bearing materials with and without the impregnated oil, and obtained the following results.

TABLE 1

|  | Coefficient of Friction | Wear Amount (mg) |
|---|---|---|
| Polyacetal | 0.35 | 9 |
| Oleo-polyacetal | 0.25 | 3.3 |
| Carbon fiber-incorporated polyacetal | 0.5 | 10 |

The tests for the sliding characteristics were carried out under thrust conditions of a load of 20 kg, a speed of 0.2 m/sec, and a test duration of 15 hours.

In the results given in Table 1, the fiber does not have an effective sliding characteristic. The present inventors therefore devised various methods for impregnating lubricating oil but could not dramatically improve the sliding characteristics over those given in Table 1. The present inventors then conducted research into the components of the bearing materials. The present inventors discovered that the bearing materials in which the aromatic group-, polyamide fiber is incorporated, can improve the sliding characteristics. The experiments by the present inventors are further explained with reference to FIGS. 1 through 6.

DESCRIPTION OF THE PREFERRED EMBODIMENTS

Figure 1:
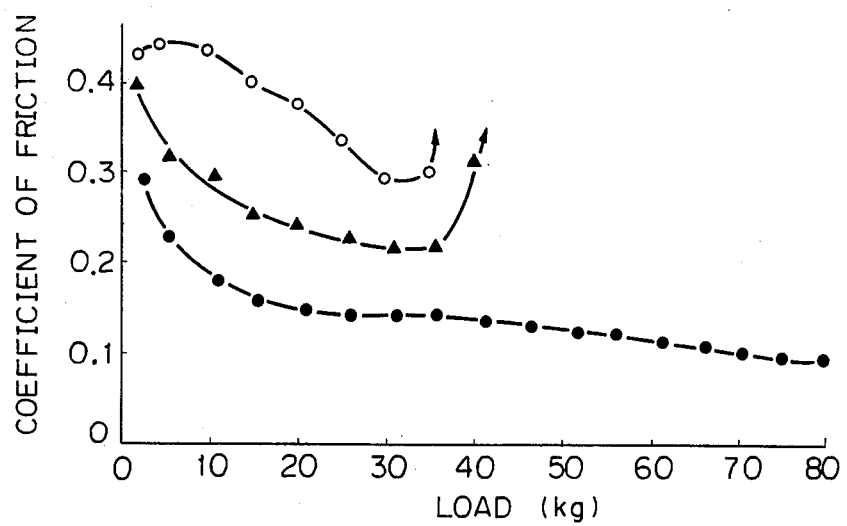
FIG. 1 graphically illustrates the dependence of the coefficient of friction upon the load.

Sliding Characteristics Influenced by Incorporation of Aromatic Group-, Polyamide Fiber Referring to FIG. 1, the dependence of the coefficient of friction upon the load is illustrated with respect to the polyacetal alone (—o—), the commercially available oleo-polyacetal (—Δ—), and the polyacetal, which contains the aromatic group-, polyamide-fiber and a minor amount of lubricating oil and graphite in accordance with the present invention (—•—). The identical symbols are used in FIGS. 1 through 6. The test conditions for the coefficient of friction are a speed of 0.2 m/sec a load-increasing rate of 5 kg/hr, and dry lubricating.

As is apparent from FIG. 1, the coefficient of friction is stable and even becomes lower under a load exceeding 40 kg, when the aromatic group-, polyamide fiber is incorporated into the polyacetal (—•—) in accordance with the present invention.

Figure 2:
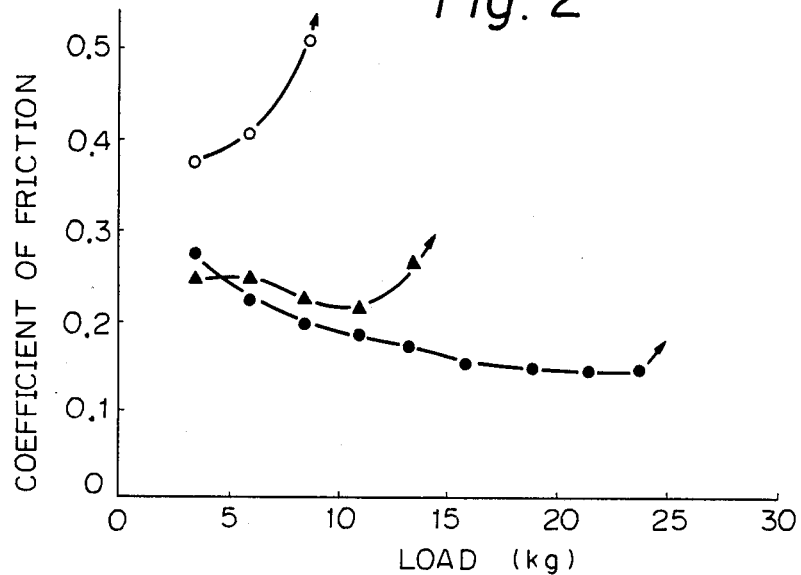
FIG. 2 is a graph similar to FIG. 1.

In the test illustrated in FIG. 2, the speed is 0.67 m/sec, higher than in the case of FIG. 1, and the load-increasing rate is 2.5 kg/hr, lower than in the case of FIG. 1. As is apparent from FIG. 2, the aromatic group-, polyamide fiber polyacetal imparts (—•—), a stable, low coefficient of friction. The seizure of this polyacetal (—•—) occurs at a load of approximately 25 kg.

Figure 3:
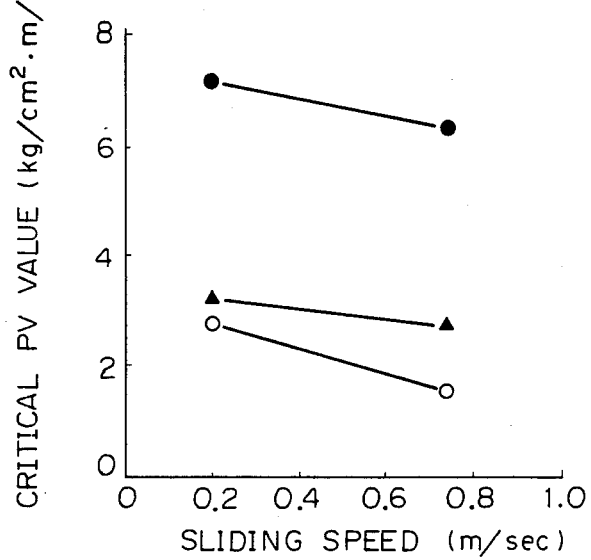
FIG. 3 graphically illustrates the dependence of the limitative CV value upon the speed.

Referring to FIG. 3, the dependence of the limitative PV-value upon the sliding speed, with regard to the above described three polyacetal bearing materials (—•—, — —, —O —) is illustrated. As is apparent from FIG. 3, tne limitative PV-value of the polyacetal bearing material according to the present invention (—•—) is as high as twice or more that of material (—•—), which corresponds to the commercially available oleo-polyacetal bearing material.

Figure 4:
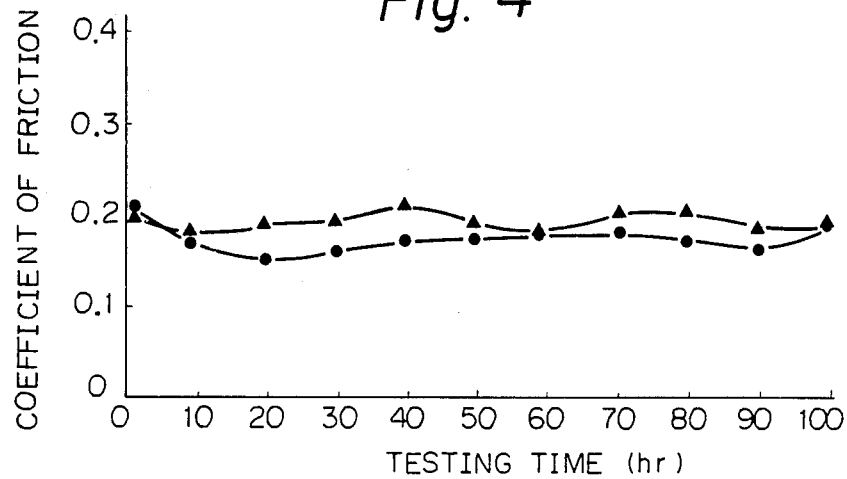
FIG. 4 graphically illustrates the change of coefficience of friction in accordance with time.

Referring to FIG. 4, in which the marks —•— and — — denote the same bearing materials as in FIG. 1, the change in the coefficient of friction in accordance with test duration is illustrated. The test is carried out under the following constant load thrust conditions: drilling mill-thrust tester; speed-0.2 m/sec; and, load-20 kg. As is apparent from FIG. 4, the aromatic group-, polyamide fiber stabilizes and reduces the coefficient of friction of polyacetal (—•—) as compared with the commercially available oleo-polyacetal bearing material.

Figure 5:
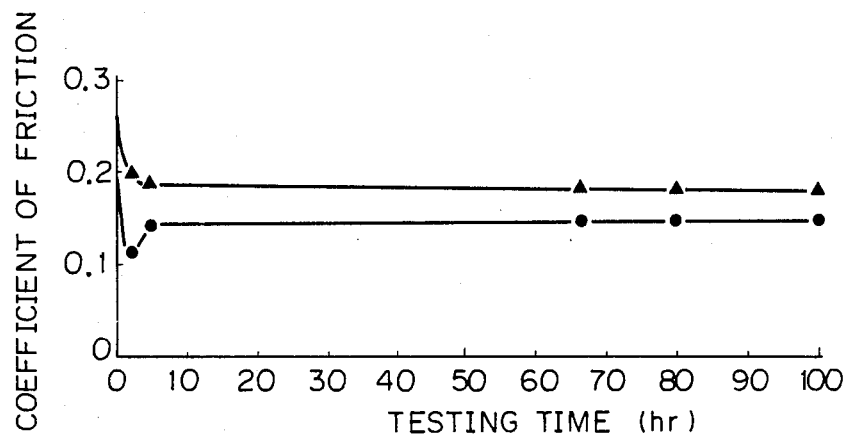
FIG. 5 is a graph similar to FIG. 1.

FIG. 5 illustrates the same dependence as in FIG. 4 in a case of the bush journal test. The test was carried out under the following conditions: testor-bell type-journal testor; load—3.4 kg (constant); rotation number—300 rpm; and; an opposite material—SUS 304. As is apparent from FIG. 5, the aromatic group-, polyamide fiber reduces the coefficient of friction more than does the lubricating oil in the material (—•—), which corresponds to the commercially available oleopolyacetal bearing material.

Figure 6:
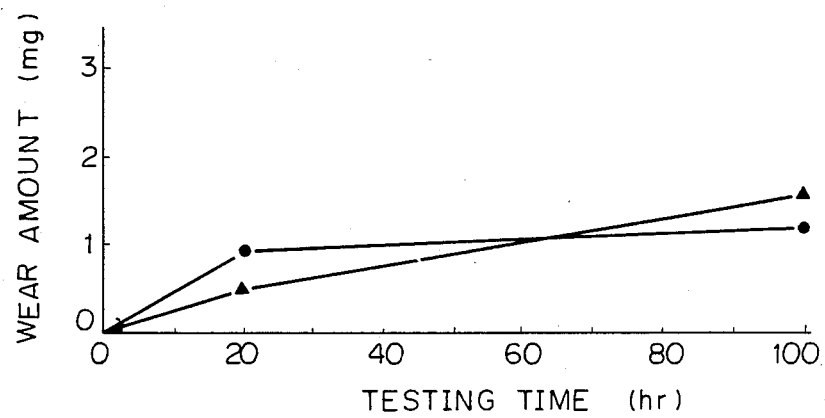
FIG. 6 graphically illustrates the change of wear amount in accordance with time.

Referring to FIG. 6, the wear amount, which is measured under the same conditions as in FIG. 5, is illustrated. As is apparent from FIG. 6, the aromatic group-, polyamide fiber polyacetal imparts (—•—) polyacetal a liability of initial wear but at a small stationary wear as compared with material (— —) which corresponds to the commercially available oleo-polyacetal bearing.

In summarizing the descriptions with reference to FIGS. 1 through 6, the aromatic group-, polyamide fiber provides, as one of the components of the polyacetal bearing materials, a stably low coefficient of friction, a high PV-value, and a stably small wear amount, especially under a high load. Note that the aromatic group-, polyamide fiber improves almost all of the sliding characteristics as compared with the lubricating oil.

Although the above descriptions refer to the polyacetal bearing material including both the lubricating oil and the aromatic group-, polyamide fiber, virtually identical properties were confirmed for the polyacetal bearing material including only the aromatic group-, polyamide fiber.

Figure 7A:
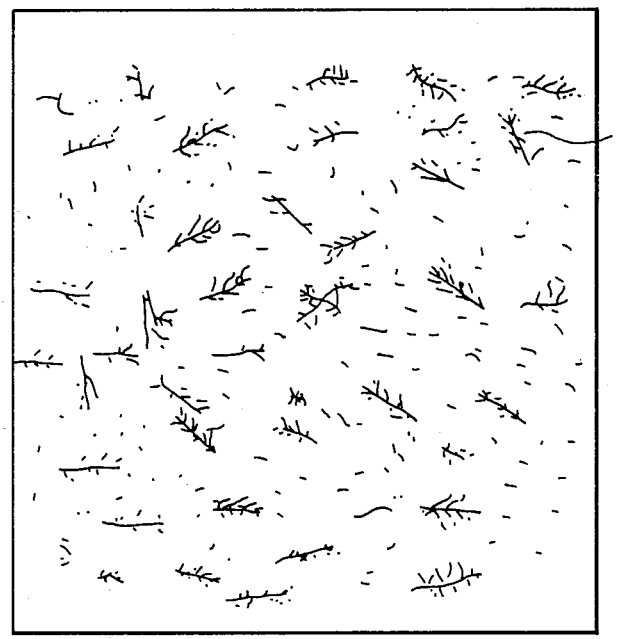
FIGS. 7(A) and (B) are sketches of microscope views of the bearing materials with and without the entanglement of aromatic group, polyamide fibers, respectively.
Figure 7:
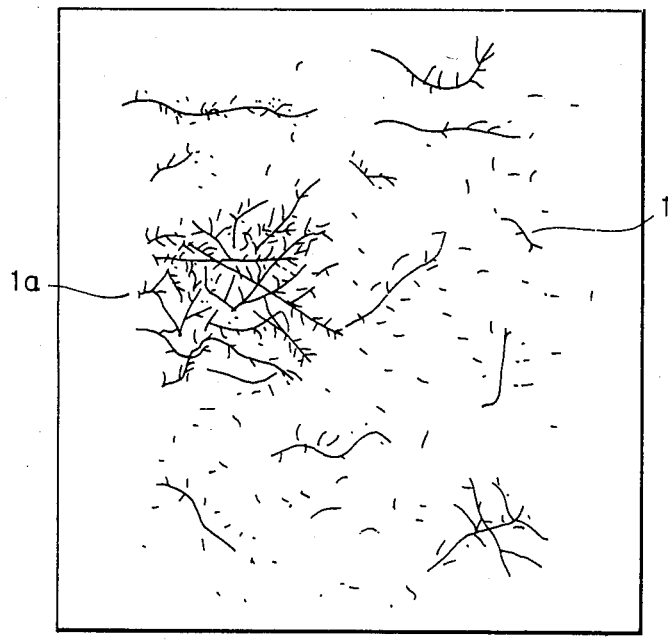

In the experiments described above, the aromatic-group, polyamide fiber is in the form of the commercially available pulp, or commercially available chips cut to a length of 3 mm or less. The inventors expected, taking into consideration the shape of the fiber filaments, that the fiber would b firmly bonded with the polyacetal so as to improve the sliding characteristics. The improvement, however, was not as much as the present inventors expected. This appears to be because the entanglement of the aromatic group, polyamide fiber (shown by "1a" in FIG. 7B) occurs in the thermoplastic resin and the so-entangled mass in the form of a cluster acts as a cleavage and causes ruptures therein. When this rupturing occurs, a large number of the aromatic group-, polyamide fiber peels out of the base resin material. The present inventors considered the use of an appropriate dispersing agent for preventing the entanglement but could not achieve the intended dispersion state. Since the entanglement could be prevented only incompletely, by means of the dispersion agent, the present inventors carried out further experiments and discovered that, by cutting the extruded mass of the components of the bearing material the entanglement could be avoided. The bearing material prepared by the method including the cutting process is free of entanglement and the aromatic group-, polyamide fiber in this material is in the form as shown by "1" in FIG. 7A. This fiber 1, is in the form of a short fiber, is uniformly distributed in the thermoplastic resin, and does not entangle.

A further improvement in the sliding characteristics due to the prevention of entanglement is described with reference to the experiments.

Testing Condition

Testor-thrust type-, friction wear testor
Load—30 kgf
Friction speed—0.2 m/sec
Test time—100 hours Test Samples No. 1—polyacetal alone
No. 2—polyacetal+4 wt % oil (impregnated)
No. 3—polyacetal+4 wt % oil (impregnated+2 wt % aromatic group-, polyamide fiber (cut in accordance with the invention)
No. 4—polyacetal+4 wt % oil (impregnated)+2 wt % aromatic group-, polyamide fiber (chip, average length 2 mm)
No. 5—polyacetal+4 wt % oil (impregnated)+2 wt % aromatic group-, polyamide fiber (long pulp)

Figure 8:
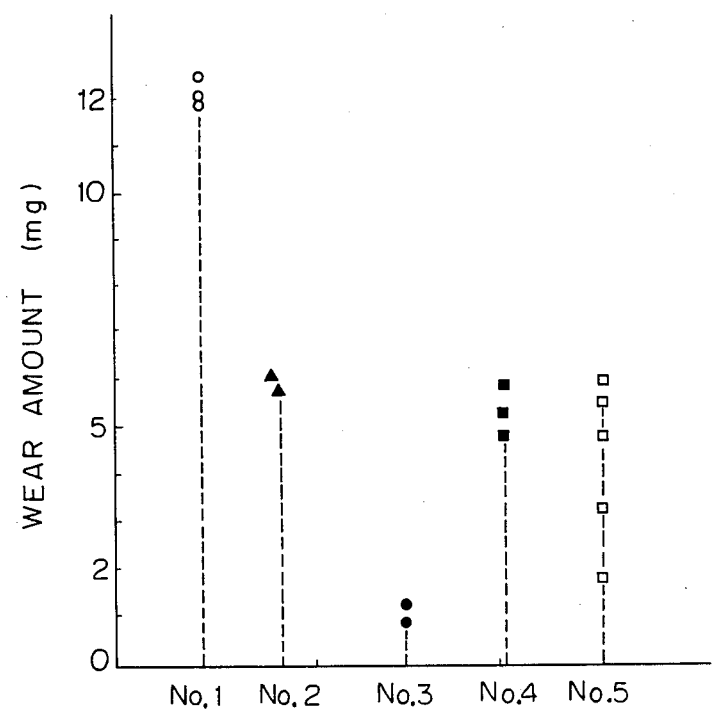
FIGS. 8, 9, and 10 are graphs showing the wear amount, load, and coefficient of friction of the bearing materials, respectively.

The test results are shown in FIG. 8. As is apparent from FIG. 8, the aromatic group-, polyamide fiber, which is cut to get rid of the entanglement and is incorporated into the polyacetal, makes the wear amount and its dispersion small (No. 3).

Using the above five samples, the limitative load was measured under the conditions:
testor—a thrust testor;
load-increased at a rate of 5 kg/hour; thrust speed -0.2 m/sec.

Figure 9:
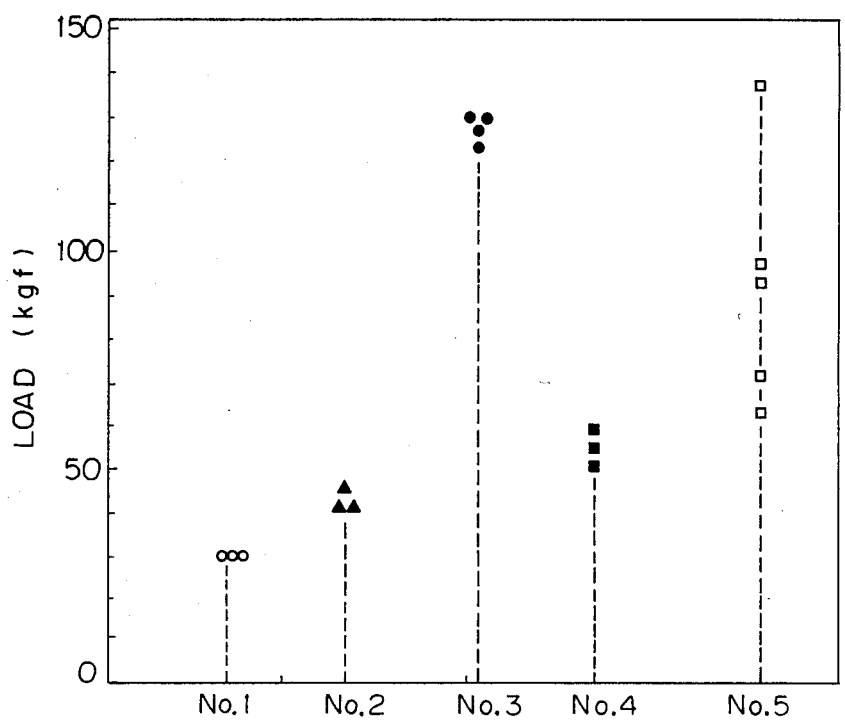

The results are shown in FIG. 9.

As is apparent from FIG. 9, the aromatic group-, polyamide fiber, which is cut to get rid of the entanglement and is incorporated in the polyacetal, enhances the limitative load and decreases its dispersion.

Again using the above five samples, the coefficient of friction was measured under the following conditions:
testor—thrust type-, friction wear testor;
load—30 kgf;
speed—0.2 m/sec;
time—100 hours.

Figure 10:
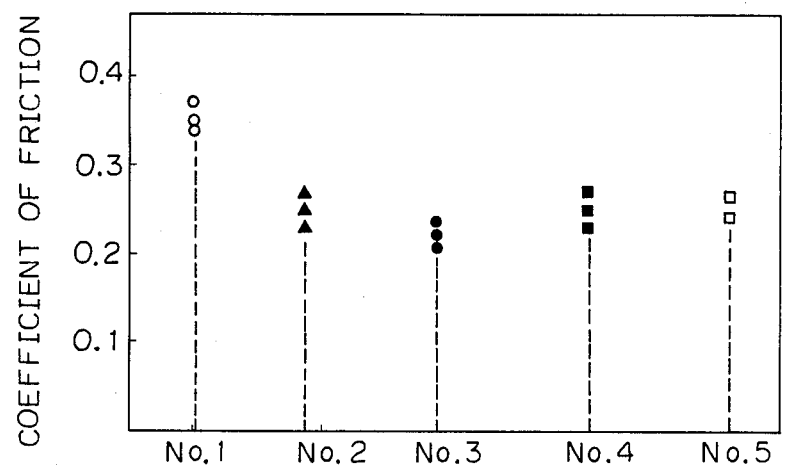

The results are shown in FIG. 10.

As is apparent from FIG. 10, although dispersion of the coefficient of friction is undistinguishable among the five samples, the coefficient of friction of the sample according to the present invention (No. 3) is lower than the other samples.

The aromatic group-, polyamide fiber is known under the names of Kevler (the resistered trade name of Dupont) and Teijin Cornex (Teijin Co. Ltd) and is commonly referred to as the alamide fiber which is used in the following descriptions.

Proposals for utilizing the high strength of the alamide fiber in various applications have been made, such as automobile brake drum shoes and brake shoes of railway vehicles, in which a stably high coefficient of friction, an excellent wear resistance, and a non-grinding property against the opposite material are requested, there are also a number of proposals for using the alamide fiber which is used alone or with the binder in a consolidated shape of a brake or the like. The alamide fiber also provides the basic bearing material, such as polyacetal, a stably low coefficient of friction, a high PV-value, with an improved wear resistance, and non-wearing property against the opposite material. These properties are attained in both thrust and journal type bearing materials.

The alamide fiber is available in the form of a yarn, a chip, and a pulp. In the present invention, the available pulp is used as is, or a pulp cut into an appropriate length, e.g., 3 mm or shorter, is used.

The basic component of the bearing material according to the present invention is a thermoplastic resin which is preferably at least one member selected from the group consisting of polyacetal (POM), polyamide resin (PA), polycarbonate (PC), polyphenylene sulfide (PPS), polybutylene terephthalate (PBT), and ultra-high molecular weight polyethylene (UHMWP).

The other components which can be optionally incorporated into the bearing material according to the present invention, are now described.

The lubricating oil, such as synthetic oil and mineral oil, further decreases the coefficient of friction and further enhances the PV-value.

Polytetrafluoro ethylene (PTFE) further decreases the coefficient of friction and wear amount.

Solid lubricants, such as $MoS_2$, graphite, and, metallic soap (e.g., zinc or lithium stearate), further decrease the coefficient of friction. Graphite exhibits an effect of retaining a small amount of the lubricating oil and exhibits a large lubricating effect.

Activated carbon enhances the shapability of the raw materials and retains the lubricating oil.

The activated carbon and graphite are effective for enhancing the loading capacity, especially when lubricating oil in an amount of 4% by weight is copresent.

Preferred amounts of the components of the bearing material according to the present invention are now described. The percentage for the content of the components is based on the weight of the bearing material. The alamide fiber, PTFE, and solid lubricant are collectively referred to as the solid content.

A preferred content of alamide fiber is from 0.05 to 25%. If this content is less than 0.05%, the alamide fiber does not effectively attain an improvement in the sliding characteristics as described above. If the content is more than 25%, it becomes difficult to blend the alamide fiber and thermoplastic resin. A more preferred content is from 0.1 to 15%, a further more preferred content is from 0.5 to 5%.

A preferred content of lubricating oil is 25% at the highest. If this content exceeds 25%, the strength of the bearing material is reduced, and this strength reduction directly causes an impairment of the load resistance. The bearing material having a low load resistance, when operated especially under a high load, cannot exhibit other good sliding characteristics. A more preferred content of lubricating oil is from 0.5 to 15%, and a further more preferred content of lubricating oil is from 2 to 10%.

A preferred contents of PTFE is 25% at the highest. At a content exceeding 25%, the wear amount increases and the load capacity decreases. A more preferred content of PTFE is from 0.5 to 15%, and a further more preferred content is from 0.5 to 3%.

A preferred content of the solid lubricant is 10% at the highest. At a content exceeding 10% the strength of the bearing material decreases. A more preferred content of the solid lubricant is from 0.1 to 5%, and a further more preferred content is from 0.5 to 3%.

A preferred content of the activated carbon is 15% at the highest. At a content exceeding 15% the strength of the bearing material decreases. A more preferred content of the activated carbon is from 0.5 to 10%, and a further more preferred content of the activated carbon is from 1 to 5%.

It is preferred in the light of the stability of the shaped article that the solid content be not more than 35%.

Graphite and activated carbon can improve formability of the mixture and loading capacity. An amount of the graphite relative to 10 parts by weight of the lubricating oil is preferably from 1 to 5 parts by weight, more preferably from 3.5 to 4.0 parts by weight. An amount of activated carbon relative to 10 parts by weight of the lubricating oil is preferably from 1 to 4 parts by weight, more preferably for 2.5 to 3.5 parts by weight for the activated carbon.

The solid content can be of any size, provided that it can be blended with the other components of the bearing material. The sizes of the solid content, which are the usual but not limiting ones, are 3 mm or less, preferably 0.5 mm or less, in length and 30 μm or less, preferably 20–30 μm, in diameter for the alamide fiber, and under 80 mesh for the graphite and solid lubricant.

Methods for producing the bearing material according to the present invention are now described.

Generally speaking, the production method successively comprises the steps of: stirring and blending the predetermined raw materials; extruding the blended mixture to form pellets; and shaping the pellets into bearings. The shaping comprises cutting, machining, and grinding.

The production method is described more specifically.

The polyacetal having the size of under 20 mesh and the alamide fiber in the form of pulp approximately 2 mm in average length in predetermined amounts are wet blended. The resultant mixture is dried at a temperature of from 100° C. to 110° C. for several hours, preferably 10 hours or more. The dried mixture is then kneaded by a dual-axis screw type kneader at a temperature of from 170° C. to 190° C. (higher than the melting point of polyacetal) and is subsequently continuously extruded into pellets having an appropriate size, e.g., approximately 2–3 mm, followed by cooling with water or the like. The cooled pellets are fed to a cutter for cutting, preferably into a length of 0.5 mm or less. During the cutting, the pulp is also cut into an average length of 0.5 mm or less. An average length of cut pulp is preferably 0.3 mm or less, particularly 0.2 mm or less. Note the entanglement of pulp is eliminated during the cutting, because the pulp is oriented along the resin blow generated by the continuous extrusion and is then cut in a direction at a right angle to the extrusion direction. The entangled pulp in the pellets is cut into filaments without entanglement, and the entanglement in the form of a cluster does not occur in the cut pellets. If necessary, lubricating oil, graphite and the like are added to the pellets and a subsequent extrusion is further carried out. The lubricating oil, graphite, or the like may be incorporated into and kneaded with the polyacetal and the pulp at the initial kneading. It is, however, preferred to incorporate the lubricating oil, graphite, or the like directly before the second kneading, since a preferred temperature of kneading and extruding is lower than the above mentioned 170°–190° C. by approximately 10° C. or more. The bearing perform is obtained by injection-molding the second extruded material.

The application of the bearing material according to the present invention is now explained. The opposite materials of the bearing material according to the present invention are steel, non-ferrous metals, ceramic, and the like. The bearing materials according to the present invention can be used in any dry or wet lubricating condition under which the conventional bearing materials are used. The oleo-bearing material according to the present invention is used under a dry lubricating condition as is the conventional bearing materials. For the bearing material containing PTFE, and a relatively large amount of PTFE is preferably used under an especially high load.

The functions of the components of the bearing material according to the present invention are considered as follows.

The thermoplastic resin exhibits, per se, the sliding characteristics and retains, as the base or matrix, the alamide fiber. The so retained alamide fiber exhibits the sliding characteristics. The alamide fiber is, per se, highly wear resistant, while the alamide fiber retained and dispersed in the base strenghthens the base due to a mechanism similar to the dispersion hardening. The ends of alamide fiber in such a dispersed state and protruding slightly out of the surface of the shaped bearing material are flubby. Due to the flubby ends of the alamide fiber, the initial wear amount may be relatively high, depending up on the sliding test condition. The flubby ends are scraped off in the advance sliding, and the surface of shaped bearing material which exhibits a high load capacity is then brought into contact with the opposite material.

Under such a contact state, the coefficient of friction is stable, and a seizure will not easily occur under high speed-and/or high load-sliding conditions.

The optional elements according to the present invention add their functions to those attained by the alamide fiber and the thermoplastic resin. Accordingly, more kinds of optional components exhibiting the sliding characteristics become available. Especially, the bearing materials containing the lubricating oil, PTFE, and solid lubricant exhibit the advantages of the conventional oleo-iron based sintered materials and are superior to the conventional (plastic) bearing materials.

EXAMPLE 1

The sliding characteristics of the bearing materials consisting of thermoplastic resin (POM) and alamide fiber are explained with reference to Table 2, in which No. 1 is a comparative example and Nos. 2–16 are examples according to the present invention.

TABLE 2

| No. | Composition (%) | | | Coefficient of Friction | Wear Amount (mg) | Loading Capacity (kg/cm²) |
| --- | --- | --- | --- | --- | --- | --- |
| | POM | Alamide Fiber | Oil | | | |
| 1 | bal | 0 | — | 0.36 | 9.0 | 35 |
| 2 | " | 0.05 | — | 0.36 | 8.6 | 35 |
| 3 | " | 0.1 | — | 0.36 | 8.2 | 35 |
| 4 | " | 0.5 | — | 0.36 | 6.8 | 40 |
| 5 | " | 1 | — | 0.36 | 5.7 | 40 |
| 6 | " | 1.5 | — | 0.36 | 4.9 | 45 |
| 7 | " | 2 | — | 0.36 | 4.3 | 50 |
| 8 | " | 2.5 | — | 0.36 | 3.9 | 50 |
| 9 | " | 3 | — | 0.36 | 3.5 | 55 |
| 10 | " | 4 | — | 0.36 | 3.0 | 55 |
| 11 | " | 5 | — | 0.36 | 2.6 | 55 |
| 12 | " | 9 | — | 0.35 | 2.4 | 60 |
| 13 | " | 12 | — | 0.35 | 2.5 | 60 |
| 14 | " | 15 | — | 0.34 | 2.6 | 60 |
| 15 | " | 20 | — | 0.34 | 4.0 | 55 |
| 16 | " | 25 | — | 0.34 | 7.0 | 40 |

As is apparent from Table 2, the sliding characteristics are enhanced with the increase in the content of alamide fiber. Note, the wear resistance and the loading capacity are remarkably enhanced. However, the loading capacity is appreciably lessened when the content of alamide fiber exceeds 20%. This is possibly because of a reduction in strength. To maintain a good loading capacity, a preferred content of alamide fiber is 20% or less, particularly 15% or less.

EXAMPLE 2

The sliding characteristics of the bearing materials consisting of alamide fiber and the lubricating oil are explained with reference to Table 3.

TABLE 3

| | Composition (%) | | | Coefficient of Friction | Wear Amount (mg) | Loading Capacity (kg/cm²) |
|---|---|---|---|---|---|---|
| No. | POM | Alamide Fiber | Oil | | | |
| 1 | bal | 2 | 0 | 0.36 | 4.3 | 50 |
| 2 | " | " | 0.2 | 0.35 | 4.0 | 50 |
| 3 | " | " | 0.5 | 0.33 | 3.4 | 55 |
| 4 | " | " | 0.8 | 0.31 | 2.9 | 60 |
| 5 | " | " | 1.0 | 0.30 | 2.6 | 60 |
| 6 | " | " | 1.5 | 0.27 | 1.7 | 65 |
| 7 | " | " | 2.0 | 0.25 | 1.0 | 75 |
| 8 | " | " | 2.5 | 0.24 | 1.0 | 80 |
| 9 | " | " | 3.0 | 0.24 | 1.0 | 85 |
| 10 | " | " | 4.0 | 0.24 | 1.0 | 85 |
| 11 | " | " | 5.0 | 0.24 | 1.0 | 85 |
| 12 | " | " | 7.0 | 0.24 | 1.1 | 75 |
| 13 | " | " | 9.0 | 0.23 | 1.2 | 60 |
| 14 | " | " | 10 | 0.23 | 1.2 | 50 |
| 15 | " | 4 | 0 | 0.36 | 3.0 | 55 |
| 16 | " | " | 0.5 | 0.31 | 2.0 | 65 |
| 17 | " | " | 1.0 | 0.28 | 1.3 | 70 |
| 18 | " | " | 1.5 | 0.26 | 1.0 | 75 |
| 19 | " | " | 2.0 | 0.25 | 0.8 | 80 |
| 20 | " | " | 3.0 | 0.24 | 0.8 | 85 |
| 21 | " | " | 4.0 | 0.24 | 0.8 | 95 |
| 22 | " | " | 5.0 | 0.24 | 0.8 | 95 |
| 23 | " | " | 7.0 | 0.24 | 0.9 | 75 |
| 24 | " | " | 10 | 0.23 | 1.1 | 55 |

As is apparent from Table 3, the alamide fiber and lubricating oil synergistically and outstandingly enhance the sliding characteristics. The content of lubricating oil is preferably 10% or less, since the wear resistance and loading capacity are impaired at a content exceeding 10%.

EXAMPLE 3

The sliding characteristics of the bearing materials consisting of alamide fiber and PTFE and additionally containing the lubricating oil are explained with reference to Table 4.

TABLE 4

| | Composition (%) | | | | Coefficient of Friction | Wear Amount (mg) | Loading Capacity (kg/cm²) |
|---|---|---|---|---|---|---|---|
| No. | POM | Alamide Fiber | Oil | PTFE | | | |
| 1 | bal | 2 | — | 0 | 0.36 | 4.3 | 50 |
| 2 | " | " | — | 0.5 | 0.34 | 3.9 | 60 |
| 3 | " | " | — | 1.0 | 0.33 | 3.4 | 70 |
| 4 | " | " | — | 2.0 | 0.30 | 2.6 | 80 |
| 5 | " | " | — | 3.0 | 0.27 | 1.7 | 90 |
| 6 | " | " | — | 4.0 | 0.25 | 1.4 | 95 |
| 7 | " | " | — | 5.0 | 0.23 | 1.1 | 95 |
| 8 | " | " | — | 6.0 | 0.22 | 1.1 | 90 |
| 9 | " | " | — | 7.0 | 0.21 | 1.1 | 85 |
| 10 | " | " | — | 10.0 | 0.20 | 1.1 | 80 |
| 11 | " | " | — | 12.0 | 0.20 | 1.2 | 80 |
| 12 | " | " | — | 15.0 | 0.19 | 1.2 | 75 |
| 13 | " | " | — | 20.0 | 0.18 | 1.3 | 75 |

TABLE 4-continued

| | Composition (%) | | | | Coefficient of Friction | Wear Amount (mg) | Loading Capacity (kg/cm²) |
|---|---|---|---|---|---|---|---|
| No. | POM | Alamide Fiber | Oil | PTFE | | | |
| 14 | " | " | 2 | 0 | 0.25 | 1.0 | 75 |
| 15 | " | " | " | 0.5 | 0.23 | 1.0 | 80 |
| 16 | " | " | " | 1.0 | 0.21 | 1.0 | 85 |
| 17 | " | " | " | 2.0 | 0.19 | 1.0 | 90 |
| 18 | " | " | " | 3.0 | 0.18 | 0.9 | 95 |
| 19 | " | " | " | 4.0 | 0.18 | 0.9 | 100 |
| 20 | " | " | " | 5.0 | 0.18 | 0.9 | 100 |
| 21 | " | " | " | 6.0 | 0.17 | 0.9 | 100 |
| 22 | " | " | " | 7.0 | 0.17 | 1.0 | 95 |
| 23 | " | " | " | 10.0 | 0.16 | 1.1 | 90 |
| 24 | " | " | " | 12.0 | 0.16 | 1.1 | 80 |
| 25 | " | " | " | 15.0 | 0.15 | 1.2 | 75 |
| 26 | " | " | " | 20.0 | 0.15 | 1.3 | 70 |

As is apparent from Table 4, the loading capacity is enhanced due to the copresence of the PTFE and lubricating oil.

EXAMPLE 4

The sliding characteristics of the bearing materials, in which the kind of thermoplastic resin materials is varied, are explained with reference to Table 5, in which Nos. 7–10 are comparative materials.

TABLE 5

| | Composition (%) | | | Coefficient of Friction | Wear Amount (mg) | Loading Capacity (kg/cm²) |
|---|---|---|---|---|---|---|
| No. | Resin (%) | Fiber | Oil | | | |
| 1 | POM bal | alamide 2.0 | — | 0.36 | 4.3 | 50 |
| 2 | PPS bal | alamide 2.0 | 2.0 | 0.28 | 5.3 | 60 |
| 3 | PC bal | alamide 2.0 | 2.0 | 0.32 | 6.8 | 45 |
| 4 | PA bal | alamide 2.0 | 2.0 | 0.28 | 3.2 | 65 |
| 5 | UHDPE bal | alamide 2.0 | 2.0 | 0.25 | 3.6 | 50 |
| 6 | PBT bal | alamide 2.0 | 2.0 | 0.31 | 1.2 | 60 |
| 7 | POM 100 | none — | — | 0.36 | 9.0 | 35 |
| 8 | POM bal | carbon fiber 20 | — | 0.50 | 10 | 25 |
| 9 | POM bal | glass fiber 20 | — | 0.65 | 140 | 15 |
| 10 | PA 100 | none — | — | 0.45 | 20 | 25 |

As is apparent from Table 5, the bearing materials, in which PPS, PC, UHDPE, PA and PBT are used instead of POM, are superior to the comparative materials.

EXAMPLE 5

The sliding characteristics of the bearing materials consisting of thermoplastic resin, alamide fiber, lubricating oil and the miscellaneous additives (solid lubricants) are explained with reference to Table 6.

TABLE 6

| | Composition (%) | | | | Coefficient of Friction | Wear Amount (mg) | Loading Capacity (kg/cm²) |
|---|---|---|---|---|---|---|---|
| No. | POM | Alamide Fiber | Oil | Miscellaneous Additives | | | |
| 1 | bal | 2 | 3 | graphite | 0.24 | 1.0 | 85 |

TABLE 6-continued

| No. | Composition (%) POM | Alamide Fiber | Oil | Miscellaneous Additives | Coefficient of Friction | Wear Amount (mg) | Loading Capacity (kg/cm$^2$) |
|---|---|---|---|---|---|---|---|
| 2 | " | " | 3 | graphite 0.5 | 0.25 | 1.1 | 90 |
| 3 | " | " | 3 | graphite 1.5 | 0.30 | 3.0 | 60 |
| 4 | " | 2 | 4 | graphite 1.5 | 0.24 | 1.0 | 90 |
| 5 | " | 2 | 7 | graphite 0 | 0.24 | 1.1 | 75 |
| 6 | " | " | 7 | graphite 1.0 | 0.24 | 1.1 | 80 |
| 7 | " | " | 7 | graphite 1.5 | 0.24 | 1.0 | 85 |
| 8 | " | " | 7 | graphite 2.0 | 0.25 | 1.1 | 80 |
| 9 | " | " | 7 | graphite 3.0 | 0.32 | 3.4 | 60 |
| 10 | " | 2 | 15 | graphite 3.0 | 0.23 | 1.0 | 80 |
| 11 | " | 2 | 0 | MoS$_2$ 0 | 0.36 | 4.3 | 50 |
| 12 | " | " | 0 | MoS$_2$ 2.0 | 0.28 | 4.0 | 60 |
| 13 | " | 2 | 2 | metal soap 0 | 0.25 | 1.0 | 75 |
| 14 | " | " | 2 | metal soap 2.0 | 0.25 | 1.0 | 80 |

The graphite and molybdenum disulfide (MoS$_2$) are under 250 mesh (−250 mesh) in size. As is apparent from Table 6, the lubricating oil and a minor amount of graphite synergistically enhance the loading capacity. Such synergistic enhancement of the loading capacity becomes more prominent when the content of the lubricating oil becomes high.

Although not given in Table 6, in the bearing materials containing graphite in an amount greater than that shown in Table 6, the graphite exhibited an ordinary lubrication function but not the function of enhancing the loading capacity.

EXAMPLE 6

In this example, the alamide fiber used is that in which the entanglement is eliminated, unless otherwise specified.

The coefficient of friction and wear amount are tested under the conditions: testor-ball mill-, thrust testor; speed—0.2 m/sec; and, load—30 hgf. The loading capacity is tested under the same conditions as in the case of FIG. 10.

TABLE 7

| Specimen No. | Composition (%) POM | PA | PC | PPS | PBT | UHMWP | Alamide Fiber | Oil | PTFE | MoS$_2$ | Metal Soap | Graphite | Active Carbon |
|---|---|---|---|---|---|---|---|---|---|---|---|---|---|
| 1 | bal. | — | — | — | — | — | 0.05 | — | — | — | — | — | — |
| 2 | " | — | — | — | — | — | 0.1 | — | — | — | — | — | — |
| 3 | " | — | — | — | — | — | 0.5 | — | — | — | — | — | — |
| 4 | " | — | — | — | — | — | 1 | — | — | — | — | — | — |
| 5 | " | — | — | — | — | — | 1.1 | — | — | — | — | — | — |
| 6 | " | — | — | — | — | — | 1.9 | — | — | — | — | — | — |
| 7 | " | — | — | — | — | — | 2 | — | — | — | — | — | — |
| 8 | " | — | — | — | — | — | 2.9 | — | — | — | — | — | — |
| 9 | " | — | — | — | — | — | 5 | — | — | — | — | — | — |
| 10 | " | — | — | — | — | — | 7 | — | — | — | — | — | — |
| 11 | " | — | — | — | — | — | 9 | — | — | — | — | — | — |
| 12 | " | — | — | — | — | — | 14 | — | — | — | — | — | — |
| 13 | " | — | — | — | — | — | 18 | — | — | — | — | — | — |
| 14 | " | — | — | — | — | — | 20 | — | — | — | — | — | — |
| 15 | " | — | — | — | — | — | 25 | — | — | — | — | — | — |
| 16 | " | — | — | — | — | — | — | — | — | — | — | — | — |
| 17 | " | — | — | — | — | — | 2 | — | — | — | — | — | — |
| 18 | " | — | — | — | — | — | 2 | — | — | — | — | — | — |

| Specimen No. | Coefficient of Friction | Wear Amount (mg) | Loading Capacity (kg/cm$^2$) | Remarks |
|---|---|---|---|---|
| 1 | 0.36 | 11.5 | 35 | Invention |
| 2 | 0.36 | 10.9 | 35 | " |
| 3 | 0.36 | 9.1 | 40 | " |
| 4 | 0.36 | 7.6 | 40 | " |
| 5 | 0.36 | 7.3 | 40 | " |
| 6 | 0.36 | 6.1 | 50 | " |
| 7 | 0.36 | 5.7 | 55 | " |
| 8 | 0.36 | 4.8 | 55 | " |
| 9 | 0.36 | 3.5 | 55 | " |
| 10 | 0.36 | 3.3 | 60 | " |
| 11 | 0.35 | 3.2 | 60 | " |
| 12 | 0.35 | 3.5 | 60 | " |
| 13 | 0.34 | 4.7 | 55 | " |
| 14 | 0.34 | 5.3 | 55 | " |
| 15 | 0.34 | 9.3 | 40 | " |
| 16 | 0.36 | 12.0 | 35 | Comparative |
| 17 | 0.36–0.37 | 5.8–12.7 | 35–50 | Comparative (pulp · average length of fiber: 2 mm) |

TABLE 7-continued

| | | | | |
|---|---|---|---|---|
| 18 | 0.36 | 11.7 | 35 | Comparative (chop) |

TABLE 8

| Specimen No. | Composition (%) | | | | | | | | | | | | |
|---|---|---|---|---|---|---|---|---|---|---|---|---|---|
| | POM | PA | PC | PPS | PBT | UHMWP | Alamide Fiber | Oil | PTFE | MoS$_2$ | Metal Soap | Graphite | Active Carbon |
| 21 | bal. | — | — | — | — | — | 0.05 | 2 | — | — | — | — | — |
| 22 | " | — | — | — | — | — | 0.5 | 10 | — | — | — | — | — |
| 23 | " | — | — | — | — | — | 1 | 3 | — | — | — | — | — |
| 24 | " | — | — | — | — | — | 1 | 5 | — | — | — | — | — |
| 25 | " | — | — | — | — | — | 2 | 2 | — | — | — | — | — |
| 26 | " | — | — | — | — | — | 2 | 5 | — | — | — | — | — |
| 27 | " | — | — | — | — | — | 2 | 8 | — | — | — | — | — |
| 28 | " | — | — | — | — | — | 2 | 10 | — | — | — | — | — |
| 29 | " | — | — | — | — | — | 5 | 1 | — | — | — | — | — |
| 30 | " | — | — | — | — | — | 5 | 4 | — | — | — | — | — |
| 31 | " | — | — | — | — | — | 5 | 0.5 | — | — | — | — | — |
| 32 | " | — | — | — | — | — | 9 | 2 | — | — | — | — | — |
| 33 | " | — | — | — | — | — | 9 | 15 | — | — | — | — | — |
| 34 | " | — | — | — | — | — | 18 | 2 | — | — | — | — | — |
| 35 | " | — | — | — | — | — | 25 | 5 | — | — | — | — | — |
| 36 | " | — | — | — | — | — | — | 2 | — | — | — | — | — |
| 37 | " | — | — | — | — | — | 2 | 2 | — | — | — | — | — |
| 38 | " | — | — | — | — | — | 2 | 2 | — | — | — | — | — |

| Specimen No. | Coefficient of Friction | Wear Amount (mg) | Loading Capacity (kg/cm$^2$) | Remarks |
|---|---|---|---|---|
| 21 | 0.26 | 9.4 | 55 | Invention |
| 22 | 0.22 | 4.9 | 45 | " |
| 23 | 0.22 | 3.5 | 75 | " |
| 24 | 0.24 | 5.9 | 75 | " |
| 25 | 0.26 | 1.3 | 75 | " |
| 26 | 0.24 | 1.3 | 85 | " |
| 27 | 0.23 | 1.4 | 70 | " |
| 28 | 0.23 | 1.6 | 50 | " |
| 29 | 0.30 | 1.7 | 70 | " |
| 30 | 0.24 | 1.2 | 90 | " |
| 31 | 0.31 | 2.6 | 65 | " |
| 32 | 0.25 | 0.9 | 85 | " |
| 33 | 0.24 | 2.7 | 40 | " |
| 34 | 0.24 | 1.3 | 75 | " |
| 35 | 0.24 | 5.9 | 75 | " |
| 36 | 0.26 | 10.2 | 50 | Comparative |
| 37 | 0.26–0.27 | 1.4–3.7 | 55–70 | Comparative (pulp · average length of fiber: 2 mm) |
| 38 | 0.26 | 9.5 | 55 | Comparative (chop) |

TABLE 9

| Specimen No. | Composition (%) | | | | | | | | | | | | |
|---|---|---|---|---|---|---|---|---|---|---|---|---|---|
| | POM | PA | PC | PPS | PBT | UHMWP | Alamide Fiber | Oil | PTFE | MoS$_2$ | Metal Soap | Graphite | Active Carbon |
| 41 | bal. | — | — | — | — | — | 0.05 | — | 3 | 1 | 2 | — | — |
| 42 | " | — | — | — | — | — | 0.1 | — | 3 | — | — | — | — |
| 43 | " | — | — | — | — | — | 2 | — | 2 | — | — | — | — |
| 44 | " | — | — | — | — | — | 2 | — | — | 2 | — | — | — |
| 45 | " | — | — | — | — | — | 5 | — | 25 | — | — | — | — |
| 46 | " | — | — | — | — | — | 5 | — | — | 2 | — | — | — |
| 47 | " | — | — | — | — | — | 10 | — | 4 | 1 | — | — | — |
| 48 | " | — | — | — | — | — | 15 | — | 7 | — | — | — | — |
| 49 | " | — | — | — | — | — | 0.05 | 2 | 3 | 1 | 2 | — | — |
| 50 | " | — | — | — | — | — | 0.1 | 5 | 3 | — | — | — | — |
| 51 | " | — | — | — | — | — | 2 | 2 | 2 | — | — | — | — |
| 52 | " | — | — | — | — | — | 2 | 10 | — | 2 | — | — | — |
| 53 | " | — | — | — | — | — | 5 | 2 | 20 | — | — | — | — |
| 54 | " | — | — | — | — | — | 5 | 0.5 | 2 | 2 | — | — | — |
| 55 | " | — | — | — | — | — | 10 | 4 | 4 | 1 | — | — | — |
| 56 | " | — | — | — | — | — | 15 | 1 | 7 | — | — | — | — |
| 57 | " | — | — | — | — | — | 2 | — | 2 | — | — | — | — |
| 58 | " | — | — | — | — | — | 2 | — | 2 | — | — | — | — |
| 59 | " | — | — | — | — | — | 2 | 2 | 2 | — | — | — | — |
| 60 | " | — | — | — | — | — | 2 | 2 | 2 | — | — | — | — |

| Specimen No. | Coefficient of Friction | Wear Amount (mg) | Loading Capacity (kg/cm$^2$) | Remarks |
|---|---|---|---|---|
| 41 | 0.25 | 8.9 | 60 | Invention |

TABLE 9-continued

| | | | | |
|---|---|---|---|---|
| 42 | 0.27 | 6.5 | 60 | " |
| 43 | 0.30 | 3.3 | 80 | " |
| 44 | 0.28 | 5.3 | 60 | " |
| 45 | 0.25 | 6.7 | 65 | " |
| 46 | 0.28 | 3.2 | 60 | " |
| 47 | 0.25 | 1.9 | 80 | " |
| 48 | 0.23 | 1.5 | 80 | " |
| 49 | 0.19 | 2.3 | 70 | " |
| 50 | 0.18 | 1.6 | 95 | " |
| 51 | 0.19 | 1.3 | 90 | " |
| 52 | 0.22 | 1.7 | 60 | " |
| 53 | 0.15 | 1.7 | 70 | " |
| 54 | 0.27 | 1.6 | 90 | " |
| 55 | 0.16 | 1.3 | 80 | " |
| 56 | 0.18 | 1.7 | 90 | " |
| 57 | 0.31–0.33 | 2.5–5.7 | 55–70 | Comparative (pulp · average length of fiber: 2 mm) |
| 58 | 0.30 | 8.0 | 55 | Comparative (pulp · average length of fiber: 2 mm) |
| 59 | 0.20–0.23 | 1.5–2.5 | 70–85 | Comparative (pulp · average length of fiber: 2 mm) |
| 60 | 0.19 | 2.4 | 60 | Comparative (chop) |

TABLE 10

| Specimen No. | Composition (%) | | | | | | | | | | | | | |
|---|---|---|---|---|---|---|---|---|---|---|---|---|---|---|
| | POM | PA | PC | PPS | PBT | UHMWP | Alamide Fiber | Oil | PTFE | MoS$_2$ | Metal Soap | Graphite | Active Carbon | Others |
| 61 | — | bal. | — | — | — | — | 2 | 2 | — | — | — | — | — | — |
| 62 | — | — | bal. | — | — | — | 2 | 2 | — | — | — | — | — | — |
| 63 | — | — | — | bal. | — | — | 2 | 2 | — | — | — | — | — | — |
| 64 | — | — | — | — | bal. | — | 2 | 2 | — | — | — | — | — | — |
| 65 | — | — | — | — | — | bal. | 2 | 2 | — | — | — | — | — | — |
| 66 | bal. | 10 | — | — | — | — | 2 | 2 | — | — | — | — | — | — |
| 67 | " | 0.5 | 0.5 | 0.5 | 0.5 | 0.5 | 2 | 4 | 3 | 0.5 | 0.1 | 0.5 | 0.5 | — |
| 68 | " | — | — | 10 | — | — | 2 | 2 | 3 | — | — | — | — | — |
| 69 | — | bal. | — | — | — | — | 2 | 2 | 3 | 2 | — | — | — | — |
| 70 | — | " | 5 | — | — | — | 2 | 2 | — | — | — | — | — | — |
| 71 | — | " | — | 10 | — | — | 2 | 2 | 3 | — | — | 1 | — | — |
| 72 | — | — | — | — | bal. | 10 | 2 | — | 3 | — | — | — | — | — |
| 73 | — | — | 10 | — | " | — | 2 | — | 3 | 2 | — | — | — | — |
| 74 | bal. | 1 | 1 | 1 | 1 | 1 | 2 | 3 | — | — | — | — | — | — |
| 75 | 100 | — | — | — | — | — | — | — | — | — | — | — | — | — |
| 76 | bal. | — | — | — | — | — | — | — | — | — | — | — | — | 20 |
| 77 | bal. | — | — | — | — | — | — | — | — | — | — | — | — | 20 |
| 78 | — | 100 | — | — | — | — | — | — | — | — | — | — | — | — |

| Specimen No. | Coefficient of Friction | Wear Amount (mg) | Loading Capacity (kg/cm$^2$) | Remarks |
|---|---|---|---|---|
| 61 | 0.32 | 5.7 | 70 | Invention |
| 62 | 0.29 | 2.5 | 105 | " |
| 63 | 0.32 | 2.1 | 125 | " |
| 64 | 0.28 | 3.1 | 90 | " |
| 65 | 0.23 | 1.9 | 50 | " |
| 66 | 0.25 | 1.5 | 70 | " |
| 67 | 0.20 | 1.3 | 90 | " |
| 68 | 0.19 | 1.2 | 95 | " |
| 69 | 0.30 | 3.0 | 80 | " |
| 70 | 0.31 | 6.0 | 65 | " |
| 71 | 0.27 | 1.7 | 130 | " |
| 72 | 0.30 | 4.4 | 70 | " |
| 73 | 0.31 | 4.2 | 65 | " |
| 74 | 0.30 | 3.3 | 55 | " |
| 75 | 0.36 | 12 | 35 | Comparative Invention |
| 76 | 0.50* | 150* | 25 | Others-carbon fiber |
| 77 | 0.75* | 1500* | 15 | Others-glass fiber |
| 78 | 0.45* | 180* | 25 | |

*seizure

The following facts will be apparent from Table 7 through 10.

(1) The alamide fiber at a content of at least 0.05% is effective for enhancing the wear resistance. The alamide fiber at a content of 1% or more is more effective for enhancing the wear resistance and is effective for enhancing the loading capacity (c.f. Nos. 1–4 and 16).

(2) The alamide fiber used in the form of a pulp as the component of the bearing material increases the dispersion of the wear amount and loading capacity (No. 17).

(3) The coefficient of friction, wear resistance, and loading capacity are considerably improved and well balanced by determining the content of alamide fiber to be in a range of from 2 to 20% (c.f. Nos. 7-14).

(4) The facts (1)-(3) generally conform to the compositions containing an optional component(s) and containing a resin component other than POM. However, please see note (5).

(5) An influence of the optional component(s) upon the sliding charactlistics is a result of the outstanding influence of the lubricating oil to improve the sliding charactlistics (Nos. 21-35). When comparing such influence upon the comparative materials (Nos. 36-40) with that upon the materials according to the present invention, the latter is more outstanding than the former with regard to particularly the wear resistance.

We claim:

1. A bearing material formed from a resin material consisting essentially of: (A) at least one thermoplastic resin material selected from the group consisting of polyacetal, polyamide, polycarbonate, polyphenylene sulfide, polyethylene terephthalate, and ultra-high molecular weight polyethylene, (B) aromatic group, polyamide fiber, and (C) a lubricant.

2. Resin bearing according to claim 1, wherein the aromatic group, polyamide fiber is in the form of short fibers free of entanglement.

3. Resin bearing according to claim 2, wherein said material is produced by the steps comprising kneading and extruding said at least one thermoplastic resin material and aromatic group polyamide fiber and then cutting the extruded material.

4. Resin bearing according to claim 3, wherein said cutting is performed to form the aromatic group, polyamide fiber having a length of 0.3 mm or less.

5. Resin bearing according to claim 1, wherein the content of said aromatic group, polyamide fiber is from 0.05 to 20% by weight.

6. Resin bearing according to claim 5, wherein said content is from 0.1 to 15% by weight.

7. Resin bearing according to claim 1, wherein the lubricant comprises a lubricating oil.

8. Resin bearing according to claim 7, wherein the content of lubricating oil is from 0.5 to 15% by weight.

9. Resin bearing according to claim 1, further comprising polytetrafluoroethylene.

10. Resin bearing according to claim 9, wherein the content of polytetrafluoroethylene is 25% by weight at the highest.

11. Resin bearing according to claim 10, wherein the content is from 0.5 to 15%.

12. Resin bearing according to claim 1, wherein the lubricant comprises a solid lubricant.

13. Resin bearing according to claim 12, wherein the content of solid lubricant is 10% by weight at the highest.

14. Resin bearing according to claim 13, wherein the content is from 0.1 to 5%.

15. Resin bearing according to claim 1, further comprising a solid lubricant and a polytetrafluoroethylene.

16. Resin according to claim 15, wherein the content of polytetrafluoroethylene is 25% at the highest and the content of solid lubricant is 10% at the highest.

17. Resin bearing according to claim 1, further comprising a lubricating oil and polytetrafluoroethylene.

18. Resin bearing according to claim 17, wherein the content of lubricating oil is from 0.5 to 15% by weight and the content of polytetrafluoroethylene is 25% by weight at the highest.

19. Resin bearing material according to claim 1, further comprising a solid lubricant, a lubricating oil and a polytetrafluoroethylene.

* * * * *